US012644017B2

(12) United States Patent
Hwang et al.

(10) Patent No.: US 12,644,017 B2
(45) Date of Patent: Jun. 2, 2026

(54) SLURRY COMPOSITION FOR METAL POLISHING

(71) Applicant: KCTECH CO., LTD., Anseong-si (KR)

(72) Inventors: Jin Sook Hwang, Anseong-si (KR); Hyun Goo Kong, Anseong-si (KR); Yun Su Kim, Anseong-si (KR)

(73) Assignee: KCTECH CO., LTD., Gyeonggi-do (KR)

( * ) Notice: Subject to any disclaimer, the term of this patent is extended or adjusted under 35 U.S.C. 154(b) by 331 days.

(21) Appl. No.: 18/684,241

(22) PCT Filed: Aug. 8, 2022

(86) PCT No.: PCT/KR2022/011727
§ 371 (c)(1),
(2) Date: Feb. 16, 2024

(87) PCT Pub. No.: WO2023/022419
PCT Pub. Date: Feb. 23, 2023

(65) Prior Publication Data
US 2025/0002755 A1 Jan. 2, 2025

(30) Foreign Application Priority Data
Aug. 17, 2021 (KR) ........................ 10-2021-0108289

(51) Int. Cl.
*C09G 1/02* (2006.01)
*C09K 3/14* (2006.01)

(52) U.S. Cl.
CPC .............. *C09G 1/02* (2013.01); *C09K 3/1409* (2013.01)

(58) Field of Classification Search
CPC ...... C09G 1/02; C09K 3/1409; C09K 3/1463; C09K 3/14; C09K 3/1454; C23F 3/06; C23F 1/26; H10P 52/402
USPC ........................ 252/79.1–79.4; 438/690–693
See application file for complete search history.

(56) References Cited

U.S. PATENT DOCUMENTS

2016/0237315 A1* 8/2016 Stender .................... C09G 1/02
2019/0382619 A1* 12/2019 Shi ........................... C09G 1/02
2020/0024515 A1* 1/2020 Lu ............................ C09G 1/02
(Continued)

FOREIGN PATENT DOCUMENTS

KR 19990014245 A 2/1999
KR 20130019332 A 2/2013
KR 20150019046 A 2/2015
(Continued)

OTHER PUBLICATIONS

Hye Won Yun et al.,"Effect of Surfactant on the Dispersion Stability of Slurry for Semiconductor Silicon CMP," J. Korean Powder Metall. Inst. Vol. 25, No. 5, pp. 395-401, 2018.
(Continued)

*Primary Examiner* — Duy Vu N Deo
(74) *Attorney, Agent, or Firm* — JCIPRNET

(57) ABSTRACT

The present invention relates to a slurry composition for metal polishing, comprising: colloidal silica; and an oxidizing agent; and at least one selected from among a polishing catalyst, a metal polishing enhancer, a polishing inhibitor, and a dishing and erosion reducer, wherein the colloidal silica has a particle size distribution of colloidal silica according to equation 1.

16 Claims, 2 Drawing Sheets

(56) References Cited

U.S. PATENT DOCUMENTS

| | | | | |
|---|---|---|---|---|
| 2020/0040256 | A1* | 2/2020 | Stender .................... | C09G 1/00 |
| 2020/0347268 | A1* | 11/2020 | Kamimura ............... | C09G 1/02 |

FOREIGN PATENT DOCUMENTS

| | | | |
|---|---|---|---|
| KR | 20150082249 | A | 7/2015 |
| KR | 20170010546 | A | 2/2017 |
| KR | 20170072524 | A | 6/2017 |
| KR | 20200053997 | A | 5/2020 |
| WO | 2023022419 | A1 | 2/2023 |

OTHER PUBLICATIONS

International Search Report and Written Opinion for Application No. PCT/KR2022/011727 dated Nov. 18, 2022.

* cited by examiner

SLURRY COMPOSITION FOR METAL POLISHING

TECHNICAL FIELD

The present disclosure relates to a slurry composition for metal polishing.

BACKGROUND ART

Recently, there have been required a large number of chemical mechanical polishing (CMP) processes for various thin films constituting devices in the field of semiconductor and display industries.

A CMP process refers to a process of flatly polishing a surface of a semiconductor wafer using a slurry containing an abrasive and various compounds through a rotation movement while the surface of the semiconductor wafer is in contact with a polishing pad. In general, it is known that a metal polishing process is performed by repeating a process of forming a metal oxide ($MO_x$) by an oxidizing agent and a process of removing the formed metal oxide with abrasive particles.

In a tungsten (W) CMP process, a slurry containing an oxidizing agent is used. Generally, a strong oxidizing agent such as hydrogen peroxide ($H_2O_2$) and iron nitrate ($FeNO_3$) is mixed with the slurry containing an abrasive such as silica and alumina minute particles. The oxidizing agent in the slurry oxidizes a tungsten surface to tungsten oxide ($WO_3$), and $WO_3$ may be easily removed with the abrasive because $WO_3$ is much weaker than tungsten (W) bulk. In the tungsten CMP process, processes of removing $WO_3$ with the abrasive in the slurry and mechanical polishing by a CMP pad, oxidizing the metal W under a WOs layer to $WO_3$ by the oxidizing agent, and continuously removing $WO_3$ are repeated to remove a tungsten (W) bulk film. In addition, a metal barrier film is also removed by a mechanism similar to tungsten polishing.

In general, a pattern such as a trench with a tungsten barrier metal film, and an insulating film (oxide, Ox) are formed at the bottom of a tungsten layer. When polishing is performed using a tungsten bulk polishing slurry composition, a polishing selectivity of W/Ox shows a linear behavior with respect to polishing process conditions. This indicates that when the polishing pressure is lowered to apply to barrier metal polishing using tungsten (W) bulk polishing slurry, a tungsten polishing rate (RR) and an oxide (Ox) polishing rate are reduced together, resulting in a relatively low pattern height of a tungsten film after polishing of a pattern film and a relatively high pattern height of an oxide (Ox) film after the polishing of the pattern film, and an issue may occur in a profile characteristic of a patter wafer, such as dishing, erosion, and the like.

DISCLOSURE OF THE INVENTION

Technical Goals

To solve the above-described problems, the present disclosure provides a slurry composition for metal polishing that may reduce defects in a pattern while securing a high tungsten polishing rate and may secure a storage stability.

However, goals to be achieved are not limited to those described above, and other goals not mentioned above can be clearly understood by one of ordinary skill in the art from the following description.

Technical Solutions

According to an embodiment of the present disclosure, there is provided a slurry composition for metal polishing which includes: colloidal silica; and an oxidizing agent; and at least one among a polishing catalyst, a metal polishing enhancer, a polishing inhibitor, and a dishing and erosion reducer, wherein the colloidal silica has a particle size distribution according to Equation 1 shown below.

$$1.0 < K < 3.0 \quad \text{[Equation 1]}$$

(K in Equation 1 is represented by Equation 2 shown below.)

$$K = (B/A) \quad \text{[Equation 2]}$$

(In Equation 2, A denotes an average particle size of colloidal silica within a depth of 50 millimeters (mm) from the top of the slurry composition for metal polishing put into a measuring cylinder with a tube having an internal diameter of 80 mm and a length of 500 mm, and B denotes an average particle size of colloidal silica within a height of 50 mm from the bottom of the measuring cylinder).

According to an embodiment of the present disclosure, Equation 2 may be measured by cooling the measuring cylinder to room temperature after storing the measuring cylinder for 30 to 40 hours at a temperature of 50° C. to 60° C. in a state in which the measuring cylinder into which the slurry composition for metal polishing is injected is sealed.

According to an embodiment of the present disclosure, in Equation 2, the measuring cylinder may be filled with the slurry composition for metal polishing up to 70% or greater of a height of the measuring cylinder.

According to an embodiment of the present disclosure, the colloidal silica may be in an amount of 0.1% by weight (wt %) to 10 wt % in the slurry composition for metal polishing.

According to an embodiment of the present disclosure, the colloidal silica may have a size of 5 nanometers (nm) to 200 nm.

According to an embodiment of the present disclosure, the polishing catalyst may include at least one selected from a group of a metal, such as silver (Ag), cobalt (Co), chromium (Cr), copper (Cu), iron (Fe), molybdenum (Mo), manganese (Mn), niobium (Nb), nickel (Ni), osmium (Os), palladium (Pd), ruthenium (Ru), tin (Sn), titanium (Ti), vanadium (V), lead (Pb), and tungsten (W), ions, and oxides thereof.

According to an embodiment of the present disclosure, the polishing catalyst may be in an amount of 0.001 wt % to 10 wt % in the slurry composition for metal polishing.

According to an embodiment of the present disclosure, the metal polishing enhancer may include at least one selected from a group consisting of glutamic acid, formic acid, acetic acid, benzoic acid, butyric acid, aminobutyric acid, oxalic acid, succinic acid, citric acid, pimelic acid, malic acid, malonic acid, maleic acid, adipic acid, tartaric acid, lactic acid, glutaric acid, glycolic acid, polyacrylic acid, ammonium polyacrylate, polymethacrylic acid, ammonium polymethacrylate, polyacrylic maleic acid, sulfonic acid, sulfonate, toluenesulfonic acid, sulfonic acid ester, a sulfonic acid ester salt, phosphoric acid, diphosphoric acid, polyphosphoric acid, phosphate, phosphoric acid ester, a phosphoric acid ester salt, an acryl/styrene copolymer, a polyacrylic acid/styrene copolymer, a polyacrylamide/acrylic acid copolymer, a polyacrylic acid/sulfonic acid copolymer, and a polyacrylic acid/maleic acid copolymer.

According to an embodiment of the present disclosure, the oxidizing agent may include at least one selected from a group consisting of hydrogen peroxide, urea hydrogen peroxide, urea, percarbonate, periodic acid, periodate, perchloric acid, perchlorate, perbromic acid, perbromate, perboric acid, perborate, permanganic acid, permanganate, persulfate, bromate, chlorate, chlorite, chromate, iodate, iodic acid, ammonium persulfate, benzoyl peroxide, calcium peroxide, barium peroxide, sodium peroxide, and carbamide peroxide.

According to an embodiment of the present disclosure, the oxidizing agent may be in an amount of 0.01 wt % to 5 wt % in the slurry composition for metal polishing.

According to an embodiment of the present disclosure, the polishing inhibitor may include at least one selected from a group consisting of glycine, alanine, serine, phenylalanine, threonine, valine, leucine, isoleucine, proline, histidine, lysine, arginine, aspartic acid, tryptophan, glutamine, betaine, cocamidopropyl betaine, and laurylpropyl betaine.

According to an embodiment of the present disclosure, the polishing inhibitor may be in an amount of 0.005 wt % to 5 wt % in the slurry composition for metal polishing.

According to an embodiment of the present disclosure, the dishing and erosion reducer may be in an amount of 0.001 wt % to 3 wt % in the slurry composition for metal polishing.

According to an embodiment of the present disclosure, the dishing and erosion reducer may include a nonionic polymer, a sugar compound, or both, and may include at least one selected from a group consisting of glucose, D-(+)-glucose monohydrate, polyethylene glycol, polyvinyl alcohol, polyglycerin, polypropylene glycol, and polyvinylpyrrolidone.

According to an embodiment of the present disclosure, the slurry composition for metal polishing may have pH of 1 to 7.

According to an embodiment of the present disclosure, the slurry composition for metal polishing may be used for polishing a tungsten metal film or a tungsten bulk film.

Effects

The present disclosure may provide a slurry composition for metal polishing which may maximally suppress occurrences of defects such as dishing and/or erosion in a pattern during and/or after polishing while securing a high polishing rate for a metal film, e.g., a tungsten film.

The present disclosure may provide a slurry composition for metal polishing with excellent polishing performance for a target metal film to be polished, and significantly enhanced storage stability.

BEST MODE FOR CARRYING OUT THE INVENTION

Figure 1:
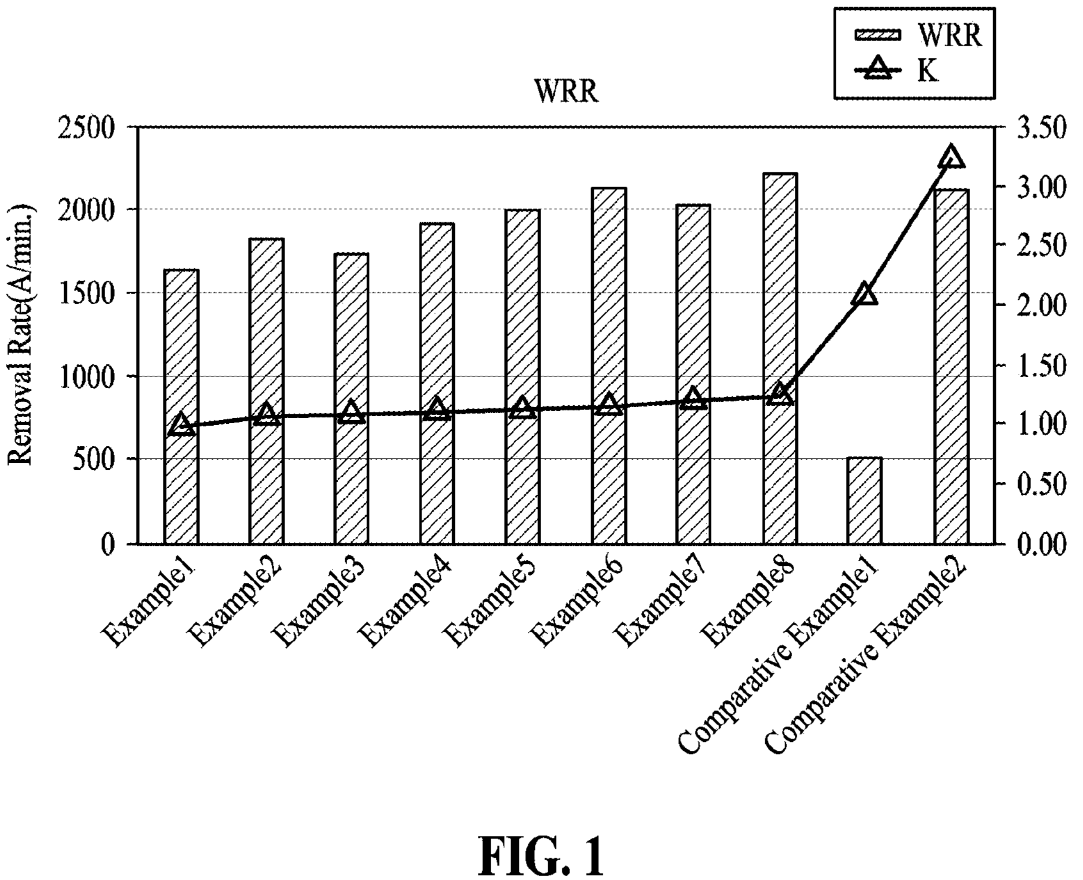
FIG. 1 illustrates measurement results of a particle size distribution of slurry compositions prepared in examples and comparative examples, according to an embodiment of the present disclosure.

Hereinafter, embodiments will be described in detail with reference to the accompanying drawings. However, various alterations and modifications may be made to the embodiments. Here, the embodiments are not meant to be limited by the descriptions of the present disclosure. The embodiments should be understood to include all changes, equivalents, and replacements within the idea and the technical scope of the disclosure.

The terminology used herein is for the purpose of describing particular embodiments only and is not intended to be limiting. The singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which the embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the embodiments with reference to the accompanying drawings, like reference numerals refer to like components and a repeated description related thereto will be omitted. In the description of embodiments, detailed description of well-known related structures or functions will be omitted when it is deemed that such description will cause ambiguous interpretation of the present disclosure.

In addition, the terms first, second, A, B, (a), and (b) may be used to describe components of the embodiments. These terms are used only for the purpose of discriminating one component from another component, and the nature, the sequences, or the orders of the components are not limited by the terms. It should be noted that if it is described in the specification that one component is "connected," "coupled" or "joined" to another component, the former may be directly "connected," "coupled," and "joined" to the latter or "connected", "coupled", and "joined" to the latter via another component.

Components included in one embodiment and components having a common function will be described using the same names in other embodiments. Unless otherwise mentioned, the descriptions on the embodiments may be applicable to the following embodiments and thus, duplicated descriptions will be omitted for conciseness.

The present disclosure relates to a slurry composition for metal polishing, and according to an embodiment of the present disclosure, the slurry composition for metal polishing may include: colloidal silica; and an oxidizing agent; and at least one among a polishing catalyst, a metal polishing enhancer, a polishing inhibitor, and a dishing and erosion reducer.

According to an embodiment of the present disclosure, the slurry composition for metal polishing may have a particle size distribution of colloidal silica according to Equation 1 shown below.

$$1.0 < K < 3.0 \quad \text{[Equation 1]}$$

$$K = (B/A) \quad \text{[Equation 2]}$$

In an example of the present disclosure, in Equation 1, K in Equation 1 is represented by Equation 2 shown above, and Equation 2 may represent a comparison of the particle size distribution according to Equation 1 by comparing an average particle of particles of the colloidal silica in a specific region, e.g., a height-based region, of a measuring cylinder.

For example, if a value of K is satisfied in the range of Equation 1, a combination of components of the slurry composition for metal polishing may be advantageous in securing high polishing of a metal film, reducing defects such as dishing and/or erosion in a pattern, and providing high long-term storage stability.

For example, in Equation 2, A denotes an average particle size of colloidal silica within a depth region of 50 millimeters (mm) from the top of the slurry composition for metal polishing put into a measuring cylinder with a tube having an internal diameter of 80 mm and a length of 500 mm, and B denotes an average particle size of colloidal silica within a height region of 50 mm from the bottom (lower end) of the measuring cylinder. A portion or all of the above-described regions may be obtained as samples and measured.

For example, the slurry composition for metal polishing may be put into the measuring cylinder, stored at a temperature of 50° C. to 65° C.; 50° C. to 65° C.; or 55° C. to 60° C. for 30 to 40 hours in a state in which the measuring cylinder is sealed, and cooled to room temperature, and colloidal silica in each of the above-described regions may be obtained, to measure the average particle size.

For example, the measuring cylinder may be filled with the slurry composition for metal polishing up to 70% or greater; 80% or greater; or 90% or greater of the total height of the measuring cylinder, and the slurry composition may be applied to a measurement of Equations 1 and 2.

According to an embodiment of the present disclosure, the colloidal silica may correspond to abrasive particles in the slurry composition for metal polishing and may be in an amount of 0.1% by weight (wt %) to 10 wt % in the slurry composition for metal polishing. If the amount of the colloidal silica is included within the above range, an appropriate mechanical polishing speed and polishing uniformity may be provided to a target film to be polished according to a polishing process, planarization after the polishing process may be improved, and imperfections such as defects and scratches may be minimized. In addition, if the amount of the colloidal silica is less than 0.1 wt %, the polishing rate may not be secured, and if the amount of the colloidal silica exceeds 10 wt %, over-polishing may occur. Due to the over-polishing, secondary defects such as dishing or erosion in a pattern may occur.

In an example of the present disclosure, to enhance planarization, polishing performance, and a dispersibility in the slurry composition for metal polishing, a particle size of the colloidal silica may include single-sized particles with a size of 5 nm to 200 nm or mixed particles with at least two different sizes of 5 nm to 200 nm. If the particle size of the colloidal silica is less than 5 nm, it may be difficult to secure a desired polishing rate, and if the particle size of the colloidal silica exceeds 200 nm, an excessively large number of defects may occur on a surface of the target film to be polished, which may result in a decrease in the polishing rate, and it may be difficult to control surface defects and the planarization after mechanical polishing due to a failure to achieve the monodispersibility. The size may refer to a diameter, a length, a thickness, and the like, depending on a shape of a particle.

In an example of the present disclosure, a particle shape of the colloidal silica may include at least one selected from a group consisting of a spherical shape, a square shape, a needle shape, and a plate shape, and may desirably include the spherical shape, and a sphericity may be "0.4" or greater; "0.6" or greater.

According to an embodiment of the present disclosure, the oxidizing agent may include at least one selected from a group consisting of hydrogen peroxide, urea hydrogen peroxide, urea, percarbonate, periodic acid, periodate, perchloric acid, perchlorate, perbromic acid, perbromate, perboric acid, perborate, potassium permanganate, sodium perborate, permanganic acid, permanganate, persulfate, bromate, chlorite, chlorate, chromate, dichromate, a chromium compound, iodate, iodic acid, ammonium persulfate, benzoyl peroxide, calcium peroxide, barium peroxide, sodium peroxide, dioxygenyl, ozone, ozonide, nitrate, hypochlorite, hypohalite, chromium trioxide, pyridinium chlorochromate, nitrous oxide, sulfate, potassium persulfate ($K_2S_2O_8$), monopersulfate (e.g., $KHSO_5$) salts, dipersulfate (e.g., $KHSO_4$ and $K_2SO_4$) salts, and sodium peroxide.

In an example of the present disclosure, the oxidizing agent may provide an appropriate polishing speed by inducing an oxidation of the target film to be polished, and may be included in an amount of 0.01 wt % to 5 wt % in the slurry composition for metal polishing. If the amount of the oxidizing agent is less than 0.01 wt %, a desired polishing rate may not be secured, and if the amount of the oxidizing agent exceeds 5 wt %, over-polishing may occur, corrosion and erosion of the target film to be polished may occur due to an increase in the amount of the oxidizing agent, and a surface may become hard.

According to an embodiment of the present disclosure, the polishing slurry composition of the present disclosure may further include a polishing accelerator, a polishing catalyst, or both. The polishing accelerator may enhance polishing of the target film to be polished, by accelerating a chemical reaction between the oxidizing agent and the target film to be polished, to enhance polishing characteristics such as a polishing speed, and reduce an occurrence of dishing.

In an example of the present disclosure, the polishing accelerator may be an iron-containing compound, or iron ions, and may include at least one selected from a group consisting of iron (II or III) nitrate; iron (II or III) sulfate; iron (II or III) halide including fluoride, chloride, bromide, and iodide; iron perchlorate, perchlorate, perbromate, and periodate, and a ferric organic iron (II or III) compound such as acetate, acetylacetonate, citrate, gluconate, oxalate, phthalate, and succinate. For example, the polishing accelerator may include at least one selected from a group consisting of iron nitrate, iron sulfate, iron halide, iron perchlorate, iron acetate, iron acetylacetonate, iron gluconate, iron oxalate, iron phthalate, and iron succinate.

In an example of the present disclosure, the polishing catalyst may transfer electrons from a metal to be oxidized to an oxidizing agent, and may include a metal, a non-metal, or both. The polishing catalyst may include at least one selected from a group consisting of a metal, such as silver (Ag), cobalt (Co), chromium (Cr), copper (Cu), iron (Fe), molybdenum (Mo), manganese (Mn), niobium (Nb), nickel (Ni), osmium (Os), palladium (Pd), ruthenium (Ru), tin (Sn), titanium (Ti), vanadium (V), lead (Pb), and tungsten (W), ions, and oxides thereof.

In an example of the present disclosure, the polishing accelerator and the catalyst may each be included in an amount of 0.001 wt % to 10 wt % in a slurry composition for metal polishing. If it is included within the above range, excellent polishing performance may be provided to the target film to be polished, and surface defects after polishing may be minimized.

According to an embodiment of the present disclosure, the metal polishing enhancer may form a protective film when a barrier metal film (i.e., a pattern layer) is exposed during polishing of a metal bulk film, to assist in a function of controlling the polishing speed and adjusting a polishing selectivity of the metal bulk film to be desired according to a polishing process. The metal polishing enhancer may correspond to, for example, a tungsten polishing enhancer. The metal polishing enhancer may be in an amount of 0.02 wt % to 2.5 wt % in the slurry composition for metal polishing. If the concentration is less than 0.02 wt %, it may be difficult to achieve a desired polishing rate, and if the concentration exceeds 2.5 wt %, secondary defects such as a contact failure of a wiring in a pattern may be caused by over-polishing of a target film and an increase in a roughness of a surface of tungsten.

In an example of the present disclosure, the metal polishing enhancer may include at least one selected from a group consisting of glutamic acid, formic acid, acetic acid, benzoic acid, butyric acid, aminobutyric acid, oxalic acid, succinic acid, citric acid, pimelic acid, malic acid, malonic acid, maleic acid, adipic acid, tartaric acid, lactic acid, glutaric acid, glycolic acid, polyacrylic acid, ammonium polyacrylate, polymethacrylic acid, ammonium polymethacrylate, polyacrylic maleic acid, sulfonic acid, sulfonate, toluenesulfonic acid, sulfonic acid ester, a sulfonic acid ester salt, phosphoric acid, diphosphoric acid, polyphosphoric acid, phosphate, phosphoric acid ester, a phosphoric acid ester salt, an acryl/styrene copolymer, a polyacrylic acid/styrene copolymer, a polyacrylamide/acrylic acid copolymer, a polyacrylic acid/sulfonic acid copolymer, and a polyacrylic acid/maleic acid copolymer.

In an example of the present disclosure, a polymer in the metal polishing enhancer may have a molecular weight (average molecular weight) of 3,000 to 20,000. If the molecular weight of the polymer is out of the above range, a stability may not be good due to a decrease in a dispersibility of the slurry composition for metal polishing, and a selectivity may not be effectively realized due to an excessive reduction in an oxide film polishing rate.

According to an embodiment of the present disclosure, the polishing inhibitor may include at least one selected from a group consisting of glycine, alanine, serine, phenylalanine, threonine, valine, leucine, isoleucine, proline, histidine, lysine, arginine, aspartic acid, tryptophan, glutamine, betaine, cocamidopropyl betaine, and laurylpropyl betaine.

In an example of the present disclosure, the polishing inhibitor may be in an amount of 0.005 wt % to 5 wt % in the slurry composition for metal polishing. If the amount of the polishing inhibitor is less than 0.005 wt %, it may be difficult to reduce dishing, and if the amount of the polishing inhibitor exceeds 5 wt %, an excessive protrusion may occur.

According to an embodiment of the present disclosure, the slurry composition for metal polishing may further include a dishing and erosion reducer, and the dishing and erosion reducer may be in an amount of 0.001 wt % to 3 wt % in the slurry composition for metal polishing. If a concentration of the dishing/erosion reducer is less than 0.001 wt %, it may be difficult to reduce dishing or erosion in a pattern and improve a desired polishing rate, and if the concentration of the dishing/erosion reducer exceeds 3 wt %, a flow of slurry may be affected due to an increase in a viscosity, which may cause an occurrence of a secondary problem, such as a change in a pattern profile.

In an example of the present disclosure, the dishing and erosion reducer may include a nonionic polymer, a sugar compound, or both, and the nonionic polymer may include at least one selected from a group consisting of glucose, D-(+)-glucose monohydrate, polyethylene glycol, polyvinyl alcohol, polyglycerin, polypropylene glycol, and polyvinylpyrrolidone.

According to an embodiment of the present disclosure, the pH of the slurry composition for metal polishing may desirably be adjusted to achieve a dispersion stability and an appropriate polishing speed according to abrasive particles, and the pH of the polishing slurry composition may have pH range of 1 to 12, and desirably an acidic pH range of 1 to 6. This may be adjusted by a pH adjuster.

In an example of the present disclosure, the pH adjuster may be used to prevent a corrosion of a target film to be polished or a corrosion of a polishing machine and to realize a pH range suitable for polishing performance, and may include an acidic material or a basic material. For example, the acidic material may include at least one selected from a group consisting of nitric acid, hydrochloric acid, phosphoric acid, sulfuric acid, hydrofluoric acid, bromic acid, iodic acid, formic acid, malonic acid, maleic acid, oxalic acid, acetic acid, adipic acid, citric acid, propionic acid, fumaric acid, lactic acid, salicylic acid, pimelic acid, benzoic acid, succinic acid, phthalic acid, butyric acid, glutaric acid, glutamic acid, glycolic acid, asparaginic acid, tartaric acid, and salts thereof, and the basic material may include at least one selected from a group consisting of ammonium methyl propanol (AMP), tetra methyl ammonium hydroxide (TMAH), ammonium hydroxide, potassium hydroxide, sodium hydroxide, magnesium hydroxide, rubidium hydroxide, cesium hydroxide, sodium bicarbonate, sodium carbonate, imidazole, and salts thereof.

According to an embodiment of the present disclosure, the polishing speed for the target film of the slurry composition for metal polishing may be in a range of 10 Å/min to 4000 Å/min.

According to an embodiment of the present disclosure, the slurry composition for metal polishing may be applied to polishing of a semiconductor wafer including a metal bulk film and applied to, for example, polishing of a barrier metal layer and a metal bulk layer formed on a semiconductor wafer. For example, the semiconductor wafer may be a semiconductor pattern wafer in which an insulating layer is formed on a substrate, a pattern layer including a barrier metal layer is formed on the insulating layer, and a metal bulk layer is formed on the pattern layer.

For example, the pattern layer may be used for a metal wiring, such as a contact plug, a via contact, a trench, and the like.

In an example of the present disclosure, the metal bulk layer (or a metal layer) may include at least one selected from a group consisting of indium (In), tin (Sn), silicon (Si), titanium (Ti), vanadium (V), gadolium (Ga), manganese (Mn), iron (Fe), cobalt (Co), copper (Cu), zinc (Zn), zirconium (Zr), hafnium (Hf), aluminum (Al), niobium (Nb), nickel (Ni), chromium (Cr), molybdenum (Mo), tantalum (Ta), ruthenium (Ru), tungsten (W), nickel (Ni), neodynium (Nd), rubidium (Rb), gold (Au), and platinum (Pt).

Hereinafter, the present disclosure will be described in detail based on examples and comparative examples.

However, the following examples are only for illustrating the present disclosure, and the present disclosure is not limited to the following examples.

EXAMPLES AND COMPARATIVE EXAMPLES

In Examples 1 to 4, polishing slurry compositions with pH of 2.5 were prepared by adding colloidal silica with an average particle size of 25 nm according to an amount of Table 1, a metal polishing enhancer (aminobutylic acid), and a dishing reducer (polyglycerin).

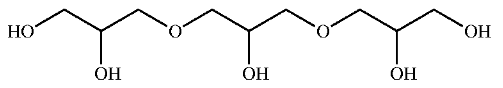

<Polyglycerin>

In Examples 5 to 8, polishing slurry compositions with pH of 2.5 were prepared by adding colloidal silica with an average particle size of 70 nm according to the amount of Table 1, a metal polishing enhancer (aminobutylic acid), and a dishing reducer (polyglycerin).

In Comparative Example 1, a polishing slurry composition with pH of 2.5 was prepared by adding colloidal silica with an average particle size of 120 nm according to the amount of Table 1.

In Comparative Example 2, a polishing slurry composition with pH of 2.5 was prepared by adding colloidal silica with an average particle size of 120 nm according to the amount of Table 1, a metal polishing enhancer (aminobutylic acid), and a dishing reducer (polyglycerin).

Figure 2:
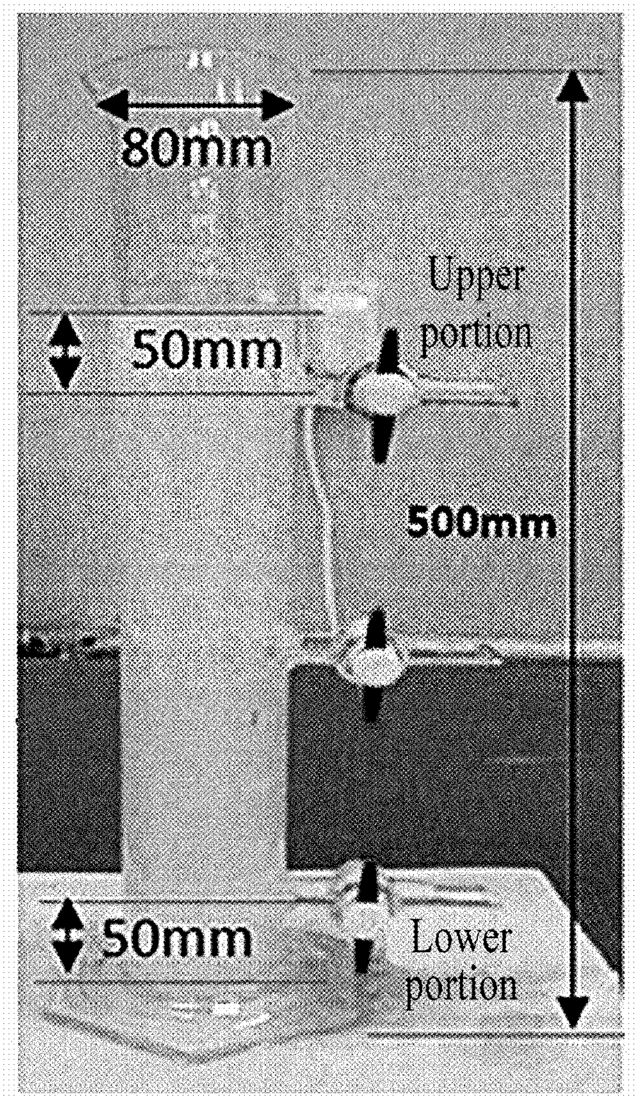
FIG. 2 illustrates a position of a measuring cylinder used to measure a particle size distribution of the slurry compositions prepared in the examples and comparative examples, according to an embodiment of the present disclosure.

Measurement of Particle Size Distribution of Slurry Compositions for Metal Polishing After injecting 2 liters (L) of slurry into a measuring cylinder with a tube having an internal diameter of 80 mm and a length of 500 mm, and covering the top with a lid, the measuring cylinder was stored at the same high temperature of 60° C. for 40 hours, slurry was cooled to 25° C., the size of a portion (upper portion, A) spaced apart by 50 mm downwards from the top of the slurry and the size of a portion (lower portion, B) spaced apart by 50 mm upwards from the bottom of the measuring cylinder were measured as shown in FIG. 2, to compare particle size distribution values according to Equation 1. The results thereof are shown in Table 1 and FIG. 1.

$$1.0 < K < 3.0 \quad \text{(Equation 1)}$$

$$K = (B/A) \quad \text{(Equation 2)}$$

Measurement of Polishing Performance of Slurry Compositions for Metal Polishing

A polishing rate of a tungsten film was measured under polishing conditions described below.

[Polishing Conditions]

1. Polishing equipment—KCT_ST-01
2. Platen speed—100 rpm
3. Carrier speed—103 rpm
4. Wafer pressure—3.0 psi
6. Slurry flow rate—250 ml/min
7. Pad—IC1000 pad

TABLE 1

| Items | Particle size (nm) | Amount (wt %) of particles | Amount (wt %) of metal polishing enhancer | Amount (wt %) of dishing reducer | WRR (Å/min) | K |
|---|---|---|---|---|---|---|
| Example 1 | 25 | 0.3 | 0.2 | 0.005 | 1645 | 1.00 |
| Example 2 | 25 | 5 | 0.2 | 0.005 | 1823 | 1.10 |
| Example 3 | 25 | 0.3 | 0.2 | 0.2 | 1738 | 1.12 |
| Example 4 | 25 | 5 | 0.2 | 0.2 | 1912 | 1.13 |
| Example 5 | 70 | 0.3 | 0.2 | 0.005 | 2003 | 1.15 |
| Example 6 | 70 | 5 | 0.2 | 0.005 | 2127 | 1.18 |
| Example 7 | 70 | 0.3 | 0.2 | 0.2 | 2035 | 1.21 |
| Example 8 | 70 | 5 | 0.2 | 0.2 | 2218 | 1.25 |
| Comparative Example 1 | 120 | 0.3 | — | — | 516 | 2.10 |
| Comparative Example 2 | 120 | 5 | 0.2 | 0.6 | 2114 | 3.24 |

Referring to Table 1, the slurry composition for metal polishing according to the present disclosure may satisfy a comparative value (a value of K) of the particle size distribution according to Equation 1, may provide a high polishing rate for a tungsten film, and may secure an effect of reducing dishing. On the contrary, Comparative Examples 1 and 2 do not satisfy Equation 1, and the value of K may deviate from Equation 1, which may cause surface defects such as dishing to increasingly occur even though a tungsten polishing rate may be secured.

While the embodiments are described, it will be apparent to one of ordinary skill in the art that various alterations and modifications in form and details may be made in these embodiments without departing from the spirit and scope of the claims and their equivalents. For example, suitable results may be achieved if the described techniques are performed in a different order, and/or if components in a described system, architecture, device, or circuit are combined in a different manner, or replaced or supplemented by other components or their equivalents.

Therefore, other implementations, other embodiments, and equivalents to the claims are also within the scope of the following claims.

The invention claimed is:

1. A slurry composition for metal polishing, comprising:

colloidal silica; and an oxidizing agent; and at least one among a polishing catalyst, a metal polishing enhancer, a polishing inhibitor, and a dishing and erosion reducer, wherein the colloidal silica has a particle size distribution according to Equation 1 shown below:

$$1.0 < K < 3.0 \quad \text{[Equation 1]}$$

(K in Equation 1 is represented by Equation 2 shown below.)

$$K = (B/A) \quad \text{[Equation 2]}$$

(In Equation 2, A denotes an average particle size of colloidal silica within a depth of 50 millimeters (mm) from the top of the slurry composition for metal polishing put into a measuring cylinder with a tube having an internal diameter of 80 mm and a length of 500 mm, and B denotes an average particle size of colloidal silica within a height of 50 mm from the bottom of the measuring cylinder).

2. The slurry composition for metal polishing of claim 1, wherein Equation 2 is measured by cooling the measuring cylinder to room temperature after storing the measuring cylinder for 30 to 40 hours at a temperature of 50° C. to 60° C. in a state in which the measuring cylinder into which the slurry composition for metal polishing is injected is sealed.

3. The slurry composition for metal polishing of claim 1, wherein, in Equation 2, the measuring cylinder is filled with the slurry composition for metal polishing up to 70% or greater of a height of the measuring cylinder.

4. The slurry composition for metal polishing of claim 1, wherein the colloidal silica is in an amount of 0.1% by weight (wt %) to 10 wt % in the slurry composition for metal polishing.

5. The slurry composition for metal polishing of claim 1, wherein the colloidal silica has a size of 5 nanometers (nm) to 200 nm.

6. The slurry composition for metal polishing of claim 1, wherein the polishing catalyst comprises at least one selected from a group of a metal, such as silver (Ag), cobalt (Co), chromium (Cr), copper (Cu), iron (Fe), molybdenum (Mo), manganese (Mn), niobium (Nb), nickel (Ni), osmium (Os), palladium (Pd), ruthenium (Ru), tin (Sn), titanium (Ti), vanadium (V), lead (Pb), and tungsten (W), ions, and oxides thereof.

7. The slurry composition for metal polishing of claim 1, wherein the polishing catalyst is in an amount of 0.001 wt % to 10 wt % in the slurry composition for metal polishing.

8. The slurry composition for metal polishing of claim 1, wherein the metal polishing enhancer comprises at least one selected from a group consisting of glutamic acid, formic acid, acetic acid, benzoic acid, butyric acid, aminobutyric acid, oxalic acid, succinic acid, citric acid, pimelic acid, malic acid, malonic acid, maleic acid, adipic acid, tartaric acid, lactic acid, glutaric acid, glycolic acid, polyacrylic acid, ammonium polyacrylate, polymethacrylic acid, ammonium polymethacrylate, polyacrylic maleic acid, sulfonic acid, sulfonate, toluenesulfonic acid, sulfonic acid ester, a sulfonic acid ester salt, phosphoric acid, diphosphoric acid, polyphosphoric acid, phosphate, phosphoric acid ester, a phosphoric acid ester salt, an acryl/styrene copolymer, a polyacrylic acid/styrene copolymer, a polyacrylamide/acrylic acid copolymer, a polyacrylic acid/sulfonic acid copolymer, and a polyacrylic acid/maleic acid copolymer.

9. The slurry composition for metal polishing of claim 1, wherein the oxidizing agent comprises at least one selected from a group consisting of hydrogen peroxide, urea hydrogen peroxide, urea, percarbonate, periodic acid, periodate, perchloric acid, perchlorate, perbromic acid, perbromate, perboric acid, perborate, permanganic acid, permanganate, persulfate, bromate, chlorate, chlorite, chromate, iodate, iodic acid, ammonium persulfate, benzoyl peroxide, calcium peroxide, barium peroxide, sodium peroxide, and carbamide peroxide.

10. The slurry composition for metal polishing of claim 1, wherein the oxidizing agent is in an amount of 0.01 wt % to 5 wt % in the slurry composition for metal polishing.

11. The slurry composition for metal polishing of claim 1, wherein the polishing inhibitor comprises at least one selected from a group consisting of glycine, alanine, serine, phenylalanine, threonine, valine, leucine, isoleucine, proline, histidine, lysine, arginine, aspartic acid, tryptophan, glutamine, betaine, cocamidopropyl betaine, and laurylpropyl betaine.

12. The slurry composition for metal polishing of claim 1, wherein the polishing inhibitor is in an amount of 0.005 wt % to 5 wt % in the slurry composition for metal polishing.

13. The slurry composition for metal polishing of claim 1, wherein the dishing and erosion reducer is in an amount of 0.001 wt % to 3 wt % in the slurry composition for metal polishing.

14. The slurry composition for metal polishing of claim 1, wherein the dishing and erosion reducer comprises a non-ionic polymer, a sugar compound, or both, and comprises at least one selected from a group consisting of glucose, D-(+)-glucose monohydrate, polyethylene glycol, polyvinyl alcohol, polyglycerin, polypropylene glycol, and polyvinylpyrrolidone.

15. The slurry composition for metal polishing of claim 1, wherein the slurry composition for metal polishing has pH of 1 to 7.

16. The slurry composition for metal polishing of claim 1, wherein the slurry composition for metal polishing is used for polishing a tungsten metal film or a tungsten bulk film.

* * * * *